United States Patent
Gu

(10) Patent No.: US 10,981,628 B2
(45) Date of Patent: Apr. 20, 2021

(54) CONTROL DEVICE FOR BICYCLE

(71) Applicant: TIEN HSIN INDUSTRIES CO., LTD., Taichung (TW)

(72) Inventor: Fong-Syuan Gu, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 18 days.

(21) Appl. No.: 16/569,085

(22) Filed: Sep. 12, 2019

(65) Prior Publication Data

US 2020/0407007 A1 Dec. 31, 2020

(30) Foreign Application Priority Data

Jun. 27, 2019 (TW) .................................. 108122592

(51) Int. Cl.
*B62M 25/08* (2006.01)
*B62M 25/04* (2006.01)
(Continued)

(52) U.S. Cl.
CPC ............. *B62M 25/08* (2013.01); *B62K 23/02* (2013.01); *B62M 25/04* (2013.01); *H01H 13/04* (2013.01); *H01H 13/12* (2013.01)

(58) Field of Classification Search
CPC ....... B62M 25/04; B62M 25/08; B62K 23/02; H01H 13/02; H01H 13/04; H01H 13/12; B62J 6/165
See application file for complete search history.

(56) References Cited

U.S. PATENT DOCUMENTS 9,821,884 B2 * 11/2017 Katsura .................. B62K 21/12
9,958,058 B2 *  5/2018 Burato ................... B62K 23/02
(Continued)

FOREIGN PATENT DOCUMENTS

| TW | 201718325 A | 6/2017 |
|---|---|---|
| TW | 201827288 A | 8/2018 |
| TW | 201834916 A | 10/2018 |

OTHER PUBLICATIONS

Examination report for TW108122592, dated Mar. 23, 2020, Total of 6 pages.
(Continued)

*Primary Examiner* — Adam D Rogers
(74) *Attorney, Agent, or Firm* — Tracy M. Heims; Apex Juris, pllc.

(57) ABSTRACT

A control device for a bicycle is disposed on a handlebar and includes a body, an electronic module, at least one switch, and at least one input member. The body includes a plugged portion and a holding portion. The plugged portion is disposed inside the handlebar via an opening of the handlebar. The holding portion is connected to the plugged portion and is disposed outside the opening. The electronic module is disposed in the plugged portion and has at least one surface. The switch is disposed on the surface of the electronic module to selectively control the electronic module to send an electronic signal. The input member is disposed on the holding portion and extends into the plugged portion and moves in an operating direction to actuate the switch. The operating direction is not perpendicular to the surface and a longitudinal axis direction of the plugged portion.

15 Claims, 18 Drawing Sheets

(51) Int. Cl.
*B62K 23/02* (2006.01)
*H01H 13/02* (2006.01)
*H01H 13/04* (2006.01)
*H01H 13/12* (2006.01)

(56) References Cited

U.S. PATENT DOCUMENTS

| | | | |
|---|---|---|---|
| 10,065,706 B2* | 9/2018 | Iino | B62M 25/00 |
| 10,093,383 B1* | 10/2018 | Masuta | B60R 16/005 |
| 10,220,915 B2* | 3/2019 | Katsura | B62M 6/45 |
| 10,279,867 B2* | 5/2019 | Katsura | B62M 25/04 |
| 10,293,884 B2* | 5/2019 | Feuerstein | B62M 25/08 |
| 10,513,311 B1* | 12/2019 | Bierwerth | B62K 21/125 |
| 2019/0359273 A1* | 11/2019 | Miles | B62K 23/02 |

OTHER PUBLICATIONS

Search report for TW108122592, dated Mar. 23, 2020, Total of 1 page.
English abstract for TW201718325, Total of 1 page.
English abstract for TW201827288, Total of 1 page.
English abstract for TW201834916, Total of 1 page.

* cited by examiner

CONTROL DEVICE FOR BICYCLE

CROSS-REFERENCE TO RELATED APPLICATIONS

This application claims the benefit of Taiwan patent application No. 108122592, filed on Jun. 27, 2019, the entire disclosure of which is incorporated herein by reference.

BACKGROUND OF THE INVENTION

Technical Field

The present disclosure relates to a bicycle, and more particularly to a control device for disposing on an end of a handlebar of a bicycle.

Description of Related Art

In recent years, bicycles have become popular as being used in a recreational activity, racing, and sports, and also used by people as commuting purposes. Therefore, electronic devices used in bicycles are also booming. For example, the common electronic devices used in bicycles include electronic lamps, indicator lights, electronic derailleurs (e.g. the front derailleur or the rear derailleur), electronic brake devices, electronic lifting seats, etc.

Each kind of electronic devices has a corresponding control device that allows the rider to manipulate the electronic devices. Most of the control device is disposed on a handlebar of a bicycle to facilitate the rider to operate the control device while riding the bicycle immediately. Take the conventional control device disposed on an end of the handlebar of the bicycle as an example, wherein the control device includes a control portion and a plugged portion. The plugged portion is disposed on and covers an outer periphery of the end of the handlebar. The control portion extends from the plugged portion and protrudes out of the end of the handlebar, wherein at least one input member is disposed on an outer periphery of the control portion, and an electronic module and a switch are disposed in the control portion. A shifting member is disposed on the control portion at a position corresponding to the switch.

However, the control portion of the conventional control device is disposed on and protrudes out of the end of the handlebar, which makes the appearance of the handlebar looks cluttered. In addition, the control portion will increase the wind resistance of the bicycle as the bicycle travels. In all aspects, the conventional control device still has room for improvements.

BRIEF SUMMARY OF THE INVENTION

In view of the above, the primary objective of the present disclosure is to provide a control device for a bicycle, which has less exposed volume after being disposed on a handlebar of the bicycle, whereby to reduce wind resistance generated during riding. In addition, the control device could facilitate a rider to easily adjust electronic devices of the bicycle.

The present disclosure provides a control device for a bicycle, which is disposed on a handlebar having an opening, including a body, an electronic module, at least one switch, and at least one input member, wherein the body includes a plugged portion and a holding portion. The plugged portion is disposed inside the handlebar via the opening. The holding portion is connected to the plugged portion and is disposed outside the opening. The electronic module is disposed in the plugged portion and has at least one surface. The at least one switch is disposed on the at least one surface of the electronic module, thereby to selectively control the electronic module to send an electronic signal. The at least one input member is disposed on the holding portion and extends into the plugged portion, wherein the at least one input member is moved in an operating direction, thereby to actuate the at least one switch. The operating direction is not perpendicular to the at least one surface of the electronic module.

The present disclosure further provides a control device for a bicycle, which is disposed on a handlebar having an opening, including a body, an electronic module, at least one switch, and at least one input member, wherein the body includes a plugged portion and a holding portion. The plugged portion is disposed inside the handlebar via the opening and has a longitudinal axis direction. The holding portion is connected to the plugged portion and is disposed outside the opening. The electronic module is disposed in the plugged portion and has at least one surface. The at least one switch disposed on the at least one surface of the electronic module. The at least one input member is disposed on the holding portion and extends into the plugged portion, wherein the at least one input member is moved in an operating direction, thereby to actuate the at least one switch. The operating direction is not perpendicular to the longitudinal axis direction of the plugged portion.

With the aforementioned design, when the control device of the present invention is disposed on the handlebar, the control device has less exposed volume. In addition, the input member is located outside the opening of the handlebar, so that when the rider holds the handlebar, the input member could be pressed by the rider's finger in a direction toward the opening, which is easier to control and saves effort in an ergonomic manner.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
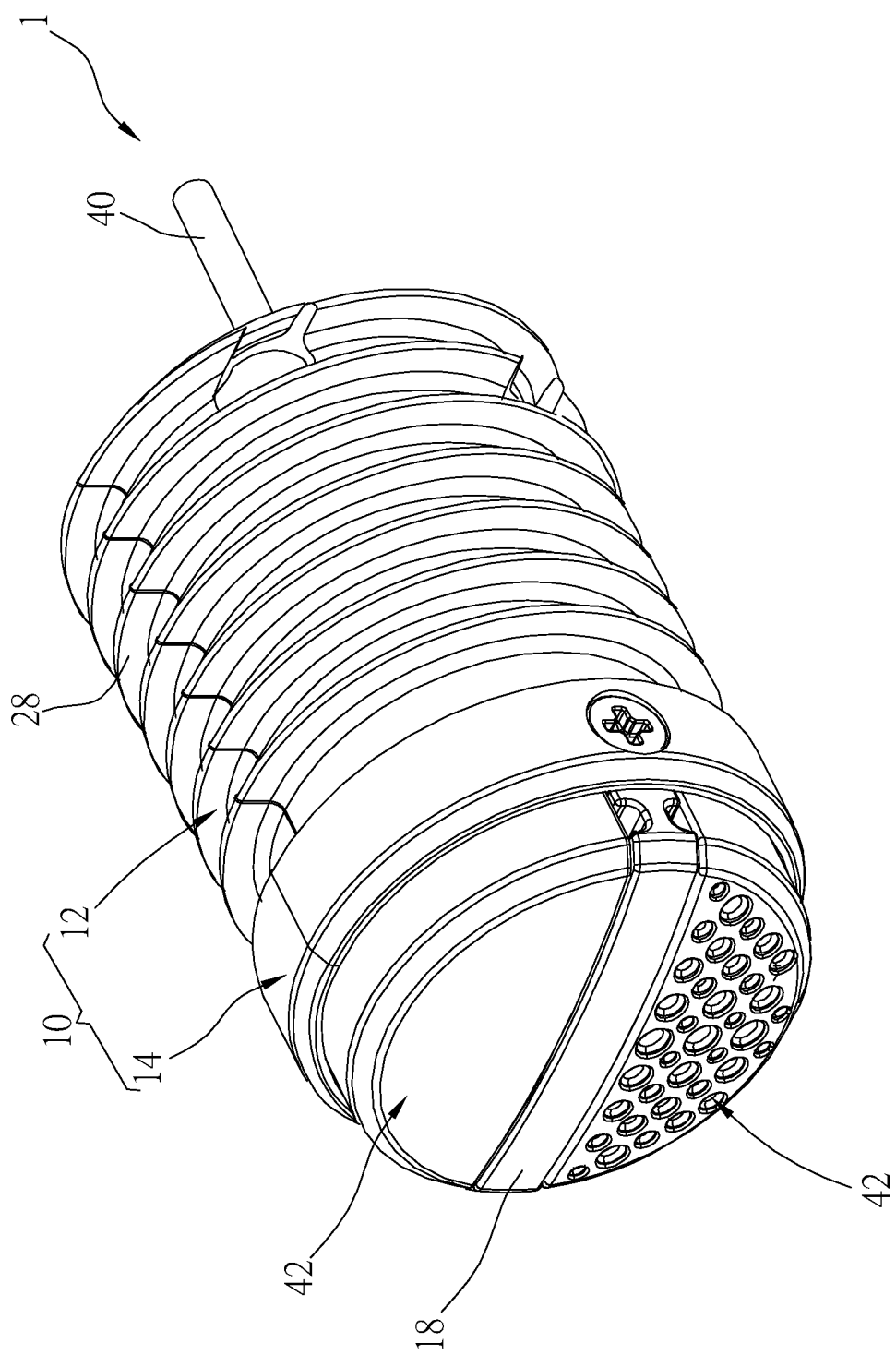
FIG. 1 is a perspective view of the control device according to a first embodiment of the present disclosure.
Figure 2:
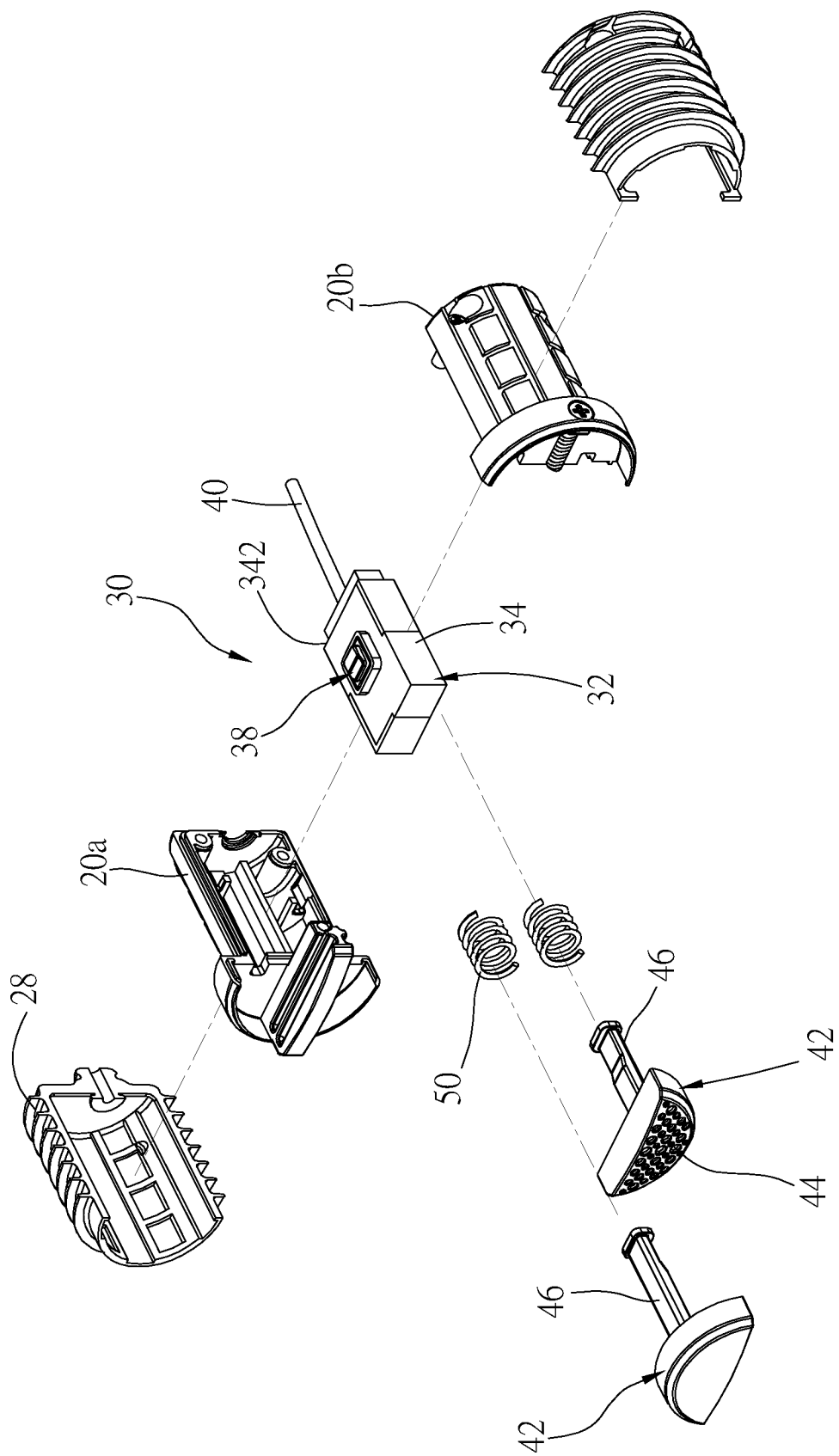
FIG. 2 is an exploded view of the control device according to the first embodiment of the present disclosure.
Figure 3:
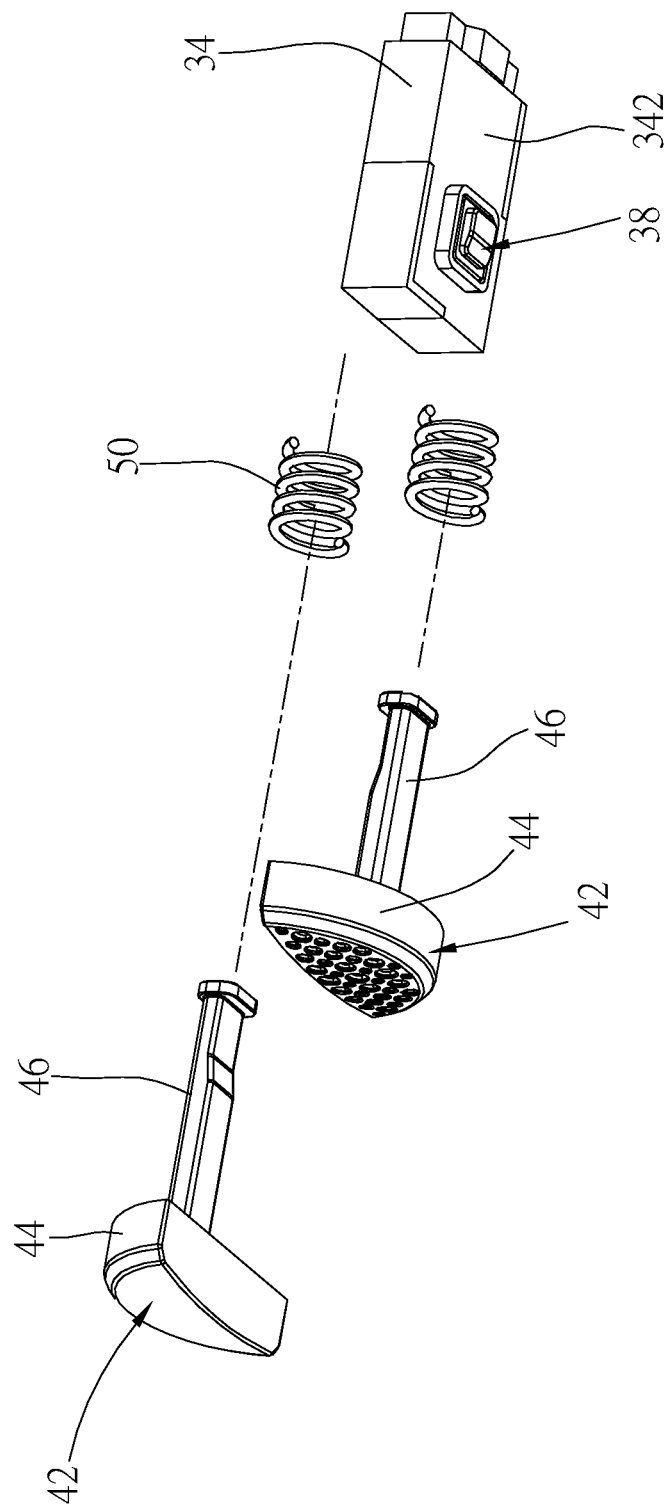
FIG. 3 is a partially exploded view of the control device according to the first embodiment of the present disclosure.

A control device 1 for a bicycle according to a first embodiment of the present disclosure is illustrated in FIG. 1 to FIG. 10. The control device 1 is disposed in a handlebar 100 of the bicycle, wherein the handlebar 100 is adapted to be held by a rider and could be aerobar, rest handlebar, flat handlebar, curve handlebar, and etc. The handlebar 100 has at least one opening 102. In the current embodiment, the opening 102 faces frontward of a moving direction of the bicycle. The control device 1 includes a body 10 and a control assembly 30, wherein the body 10 includes a plugged portion 12 and a holding portion 14.

As shown in FIG. 1 to FIG. 4, in the current embodiment, the plugged portion 12 of the body 10 is disposed into the handlebar 100 via the opening 102, and abuts against an inner peripheral surface in a radial direction of the handlebar 100. The holding portion 14 is connected to the plugged portion 12, and abuts against an outer peripheral surface in an axial direction of the opening 102. In the current embodiment, the plugged portion 12 is long in shape, and has two ends located on two opposite sides in a longitudinal axis direction C of the plugged portion 12. The holding portion 14 is integrally connected to one of the ends (i.e., the end 12a) as a monolithic unit. The other end 12b of the plugged portion 12 is located inside the handlebar 100.

Figure 4:
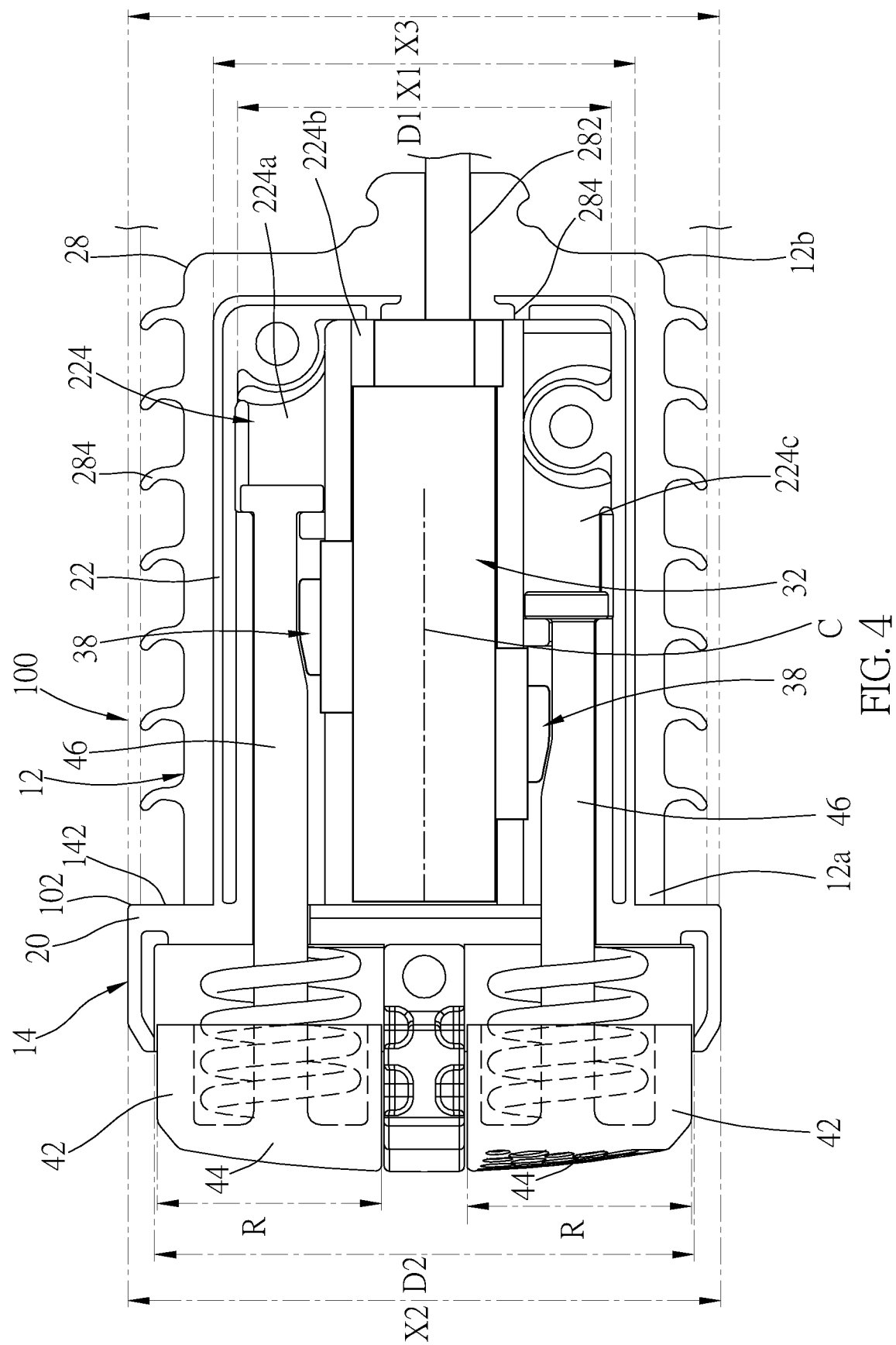
FIG. 4 is a partial side view, showing the control device according to the first embodiment of the present disclosure is disposed in the handlebar, wherein one of the half portions of the sleeve member and the second half body are omitted.
Figure 5:
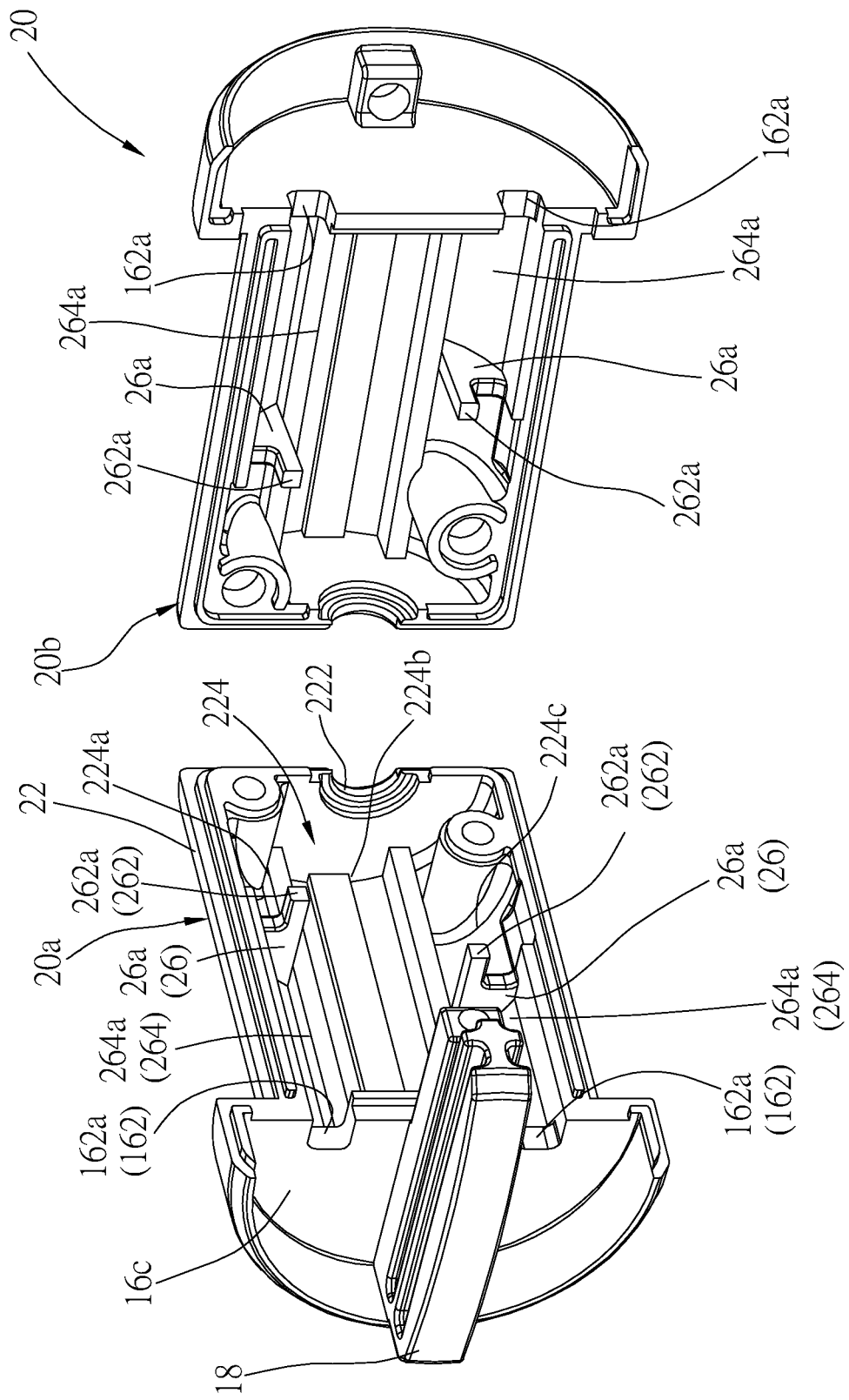
FIG. 5 is an exploded view, showing the case according to the first embodiment of the present disclosure.

As shown in FIG. 4 and FIG. 5, in the current embodiment, the body 10 includes a first half body 20a, a second half body 20b, and a sleeve member 28, wherein the first half body 20a could match with the second half body 20b to form a case 20 and a receiving space 224 inside the case 20. The sleeve member 28 could be formed by matching two half portions.

As shown in FIG. 4, the case 20 includes a first section and a second section, wherein the first section forms an inner case 22 of the plugged portion 12, and the second section forms the holding portion 14. The inner case 22 of the plugged portion 12 has a first inner diameter D1 and a first outer diameter X1. The holding portion 14 has a second inner diameter D2 and a second outer diameter X2, wherein the first inner diameter D1 is smaller than the second inner diameter D2. The opening 102 has a third outer diameter X3. In the current embodiment, the first outer diameter X1 is smaller than the second outer diameter X2. The second outer diameter X2 is greater than or equal to the third outer diameter X3. Preferably, the second outer diameter X2 is equal to the third outer diameter X3. The receiving space 224 is located in the inner case 22 of the plugged portion 12.

As shown in FIG. 5, at least one dividing member 26 is disposed in the receiving space 224, and divides the receiving space 224 into at least two chambers. In the current embodiment, two dividing members 26 are disposed in the receiving space 224, and divide the receiving space 224 into three chambers 224a, 224b, 224c. Each of the dividing members 26 has a blocking member 262 and a through hole 264 located between the blocking member 262 and the holding portion 14. Each of the dividing members 26 is formed by matching two half dividing members 26a, wherein the two half dividing members 26a are respectively located in the first half body 20a and the second half body 20b, so that the blocking member 262 is formed by matching two half blocking members 262a, and the through hole 264 is formed by matching two half through holes 264a as well.

In the current embodiment, a first hole 222 is disposed on an end of the inner case 22 which is away from the opening 102 of the handlebar 100. A second hole 282 is disposed on an end of the sleeve member 28 which is away from the opening 102 of the handlebar 100, wherein the second hole 282 is located in the first hole 222, so that the receiving space 224 of the plugged portion 12 communicates with an inner space of the handlebar 100.

The sleeve member 28 fits around the inner case 22. When the plugged portion 12 has not plugged into the handlebar 100, an outer diameter of the sleeve member 28 is greater than an inner diameter of the handlebar 100. When the plugged portion 12 is plugged into the handlebar 100, the sleeve member 28 is disposed between the inner peripheral surface of the handlebar 100 and the inner case 22, wherein an outer peripheral surface of the sleeve member 28 abuts against the inner peripheral surface of the handlebar 100, and the sleeve member 28 and the inner case 22 form the plugged portion 12. Preferably, a plurality of ribs 284 disposed on the sleeve member 28, wherein the sleeve member 28 abuts against the inner peripheral surface of the handlebar 100 via the ribs 284. In this way, the ribs 284 could increase friction between the sleeve member 28 and the inner peripheral surface of the handlebar 100, so that the plugged portion 12 is fastened on the inner peripheral surface of the handlebar 100. The ribs 284 of the sleeve member 28 could be a flexible material such as rubber, plastic, or etc.

The holding portion 14 has an abutting surface 142 located on an outer peripheral surface in a radial direction of one of the ends (i.e., the end 12a) of the plugged portion 12, wherein the abutting surface 142 abuts against the outer peripheral edge in the axial direction of the opening 102. A receiving recess 16 is disposed on the holding portion 14, wherein a bottom surface of the receiving recess 16 forms a blocking surface 16c. The blocking surface 16c and the abutting surface 142 are disposed opposite and face opposite directions. An inner wall 16a of the receiving recess 16 is formed by axially extending from an outer peripheral surface of the blocking surface 16c to a direction away from the opening 102, and surrounds the blocking surface 16c, so that the receiving recess 16 has an opening 16b which is away from the opening 102 of the handlebar 100.

In the current embodiment, a partition 18 is disposed in the receiving recess 16, and axially extends from the blocking surface 16c toward the opening 16b of the receiving recess 16 and protrudes out of the opening 16b of the receiving recess 16. The partition 18 divides the receiving recess 16 into two portions. Two through holes 162 are disposed on the blocking surface 16c of the receiving recess 16, and are respectively located on two sides of the partition 18, and communicate with the receiving space 224, and respectively communicate with two of the chambers (i.e., the chambers 224a, 224c), wherein each of the through holes 162 is formed by matching two half through holes 162a.

The control assembly 30 includes an electronic module 32, at least one switch 38, and at least one input member 42, wherein a number of the input member 42 corresponds to a number of the switch 38. In the current embodiment, the number of the input member 42 is two, and the number of the switch 38 is also two.

Figure 6:
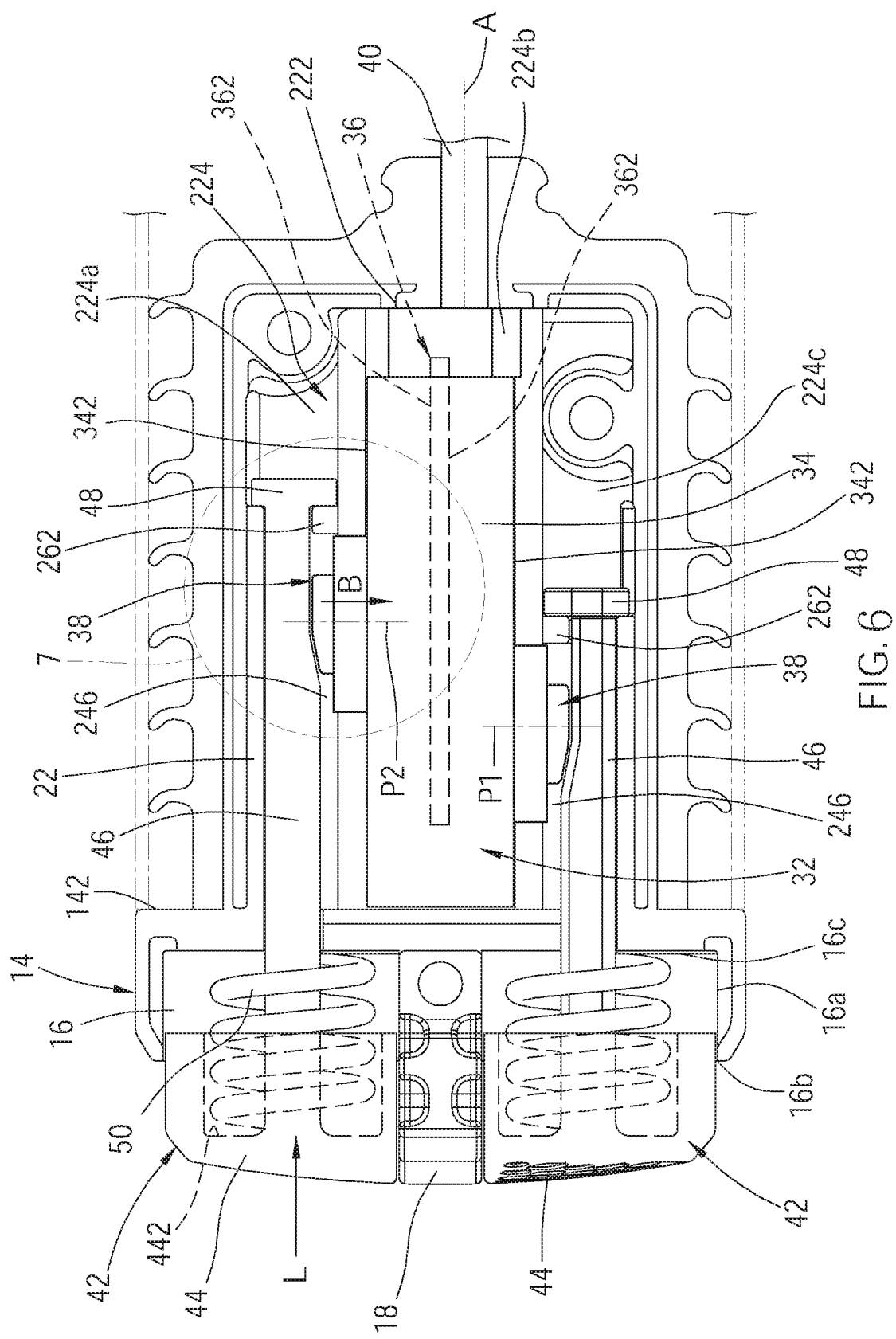
FIG. 6 is a partial side view of the control device according to the first embodiment of the present disclosure, wherein one of the half portions of the sleeve member and the second half body are omitted.

As shown in FIG. 6, the electronic module 32 is disposed in the receiving space 224 of the plugged portion 12. Preferably, the electronic module 32 is located in one of the chambers (i.e., the chamber 224b) located between the dividing members 26. The electronic module 32 includes a casing 34 and a circuit board 36, wherein the casing 34 has two opposite surfaces 342. The circuit board 36 has two opposite surfaces 362 which are parallel to the two surfaces 342 of the casing 34. In other words, the two surfaces 342 of the electronic module 32 are not coplanar, wherein at least one of the surfaces 342 is parallel to a central axis A of the handlebar 100. An extending direction of the central axis A is parallel to the longitudinal axis direction C of the plugged portion 12.

The two switches 38 are respectively disposed on the electronic module 32, and respectively protrude from the two surfaces 342 of the casing 34, wherein each of the switches 38 protrudes from the through hole 264 of one of the dividing members 26 and extends to one of the chambers 224a, 224c. Each of the switches 38 is electrically connected to the circuit board 36 of the electronic module 32. The circuit board 36 is electrically connected to a cable 40, wherein the cable 40 passes through the first hole 222, the second hole 282, and the inner space of the handlebar 100, thereby to be connected to a corresponding bicycle electronic device (not shown). The bicycle electronic device could be a shock absorber, a derailleur, a seat tube, and etc. However, the bicycle electronic device is not limited by the aforementioned design.

Each of the input members 42 is movably disposed in the receiving recess 16 of the holding portion 14, wherein a part of each of the input members 42 extends into the receiving space 224. When the rider presses the input members 42 in an operating direction L, which is parallel to the two surfaces 342 of the electronic module 32, to make the input member 42 activates the switches 38 in a predetermined direction B which intersects the operating direction L to short circuit the switches 38, the electronic module 32 sends an electronic signal to control the corresponding bicycle electronic device. In the current embodiment, the electronic signal is an electrical signal which could be transmitted to the corresponding bicycle electronic device via the cable 40. The operating direction L is parallel to the longitudinal axis direction C of the plugged portion 12.

Each of the input members 42 has an operating portion 44, a shaft portion 46, and a blocking portion 48, wherein the shaft portion 46 axially extends from the operating portion 44 to the plugged portion 12. The blocking portion 48 is disposed on the shaft portion 46 and is located on an end of the shaft portion 46 opposite to the operating portion 44. In the current embodiment, the operating portion 44 of the input members 42 have the same radial length R.

The control assembly 30 further includes an elastic member 50. In the current embodiment, the control assembly 30 includes two elastic members 50. During the process of assembling, each of the elastic members 50 fits around the shaft portion 46 of one of the input members 42. Each of the shaft portions 46 passes through one of the through holes 162 on the blocking surface 16c, thereby to enter the corresponding chambers 224a, 224c. A part of the shaft portion 46 is located in the inner case 22 of the plugged portion 12. At least a part of each of the elastic members 50 is disposed in the receiving recess 16 of the holding portion 14. An end of each of the elastic members 50 abuts against the blocking surface 16c of the holding portion 14, and another end of each of the elastic members 50 abuts against an inner peripheral surface 442 of each of the input members 42 which faces the abutting surface 142. Each of the elastic members 50 provides a reverse force opposite to the operating direction L to each of the shaft portions 46, so that the operating portion 44 of each of the input members 42 is movably disposed on the holding portion 14. The blocking portion 48 of each of the input members 42 matches with the blocking member 262 of each of the dividing members 26, so that each of the blocking members 262 is located between the corresponding blocking portion 48 and the corresponding switch 38. In this way, each of the input members 42 could move within a limited range relative to the corresponding blocking member 262 in the operating direction L.

Figure 7:
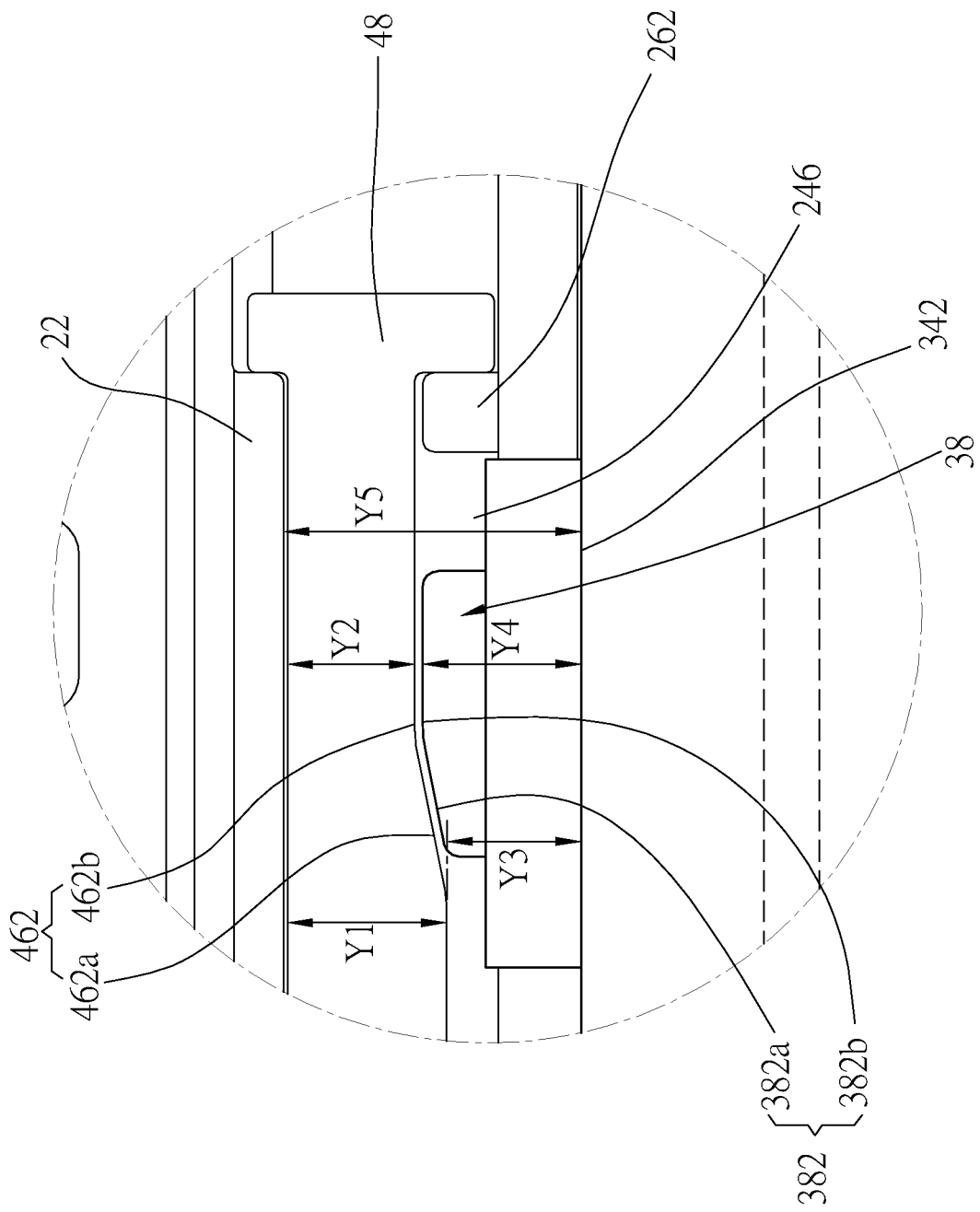
FIG. 7 is a partially enlarged view of FIG. 6.

The shaft portions 46 could directly contact the switches 38 to transmit a force without other power steering mechanisms. In the current embodiment, the shaft portions 46 of the input members 42 of the control assembly 30 contact the switches 38 in the same operating way. In order to illustrate easily, one of the input members 42 and one of the switches 38 are used for explanation herein. As shown in FIG. 6 and FIG. 7, the shaft portion 46 of the input member 42 has a first surface 462, and the switch 38 has a second surface 382, wherein the second surface 382 faces the first surface 462 of the shaft portion 46. The first surface 462 of the shaft portion 46 of the input member 42 and the second surface 382 of the switch 38 are configured in substantially the same configuration, thereby to be matched with each other. The first surface 462 of the shaft portion 46 has a first activating surface 462a and a second activating surface 462b. The second surface 382 of the switch 38 has a third activating surface 382a and a fourth activating surface 382b. In the current embodiment, the first activating surface 462a is not parallel to the second activating surface 462b of the shaft portion 46, and the third activating surface 382a is not parallel to the fourth activating surface 382b of the switch 38.

During an activating state, the shaft portion 46 moves in the operating direction L, wherein the first surface 462 of the shaft portion 46 activates the second surface 382 of the switch 38. In other words, the first activating surface 462a of the shaft portion 46 exerts a force on the fourth activating surface 382b of the switch 38, so that the switch 38 moves in the predetermined direction B, thereby the electronic module 32 forms a complete circuit and generates the electronic signal to control the corresponding bicycle electronic device, wherein a direction of the force that the shaft portion 46 exerted on the switch 38 is not parallel to the operating direction L of the shaft portion 46 and is not parallel to the predetermined direction B.

Figure 8:
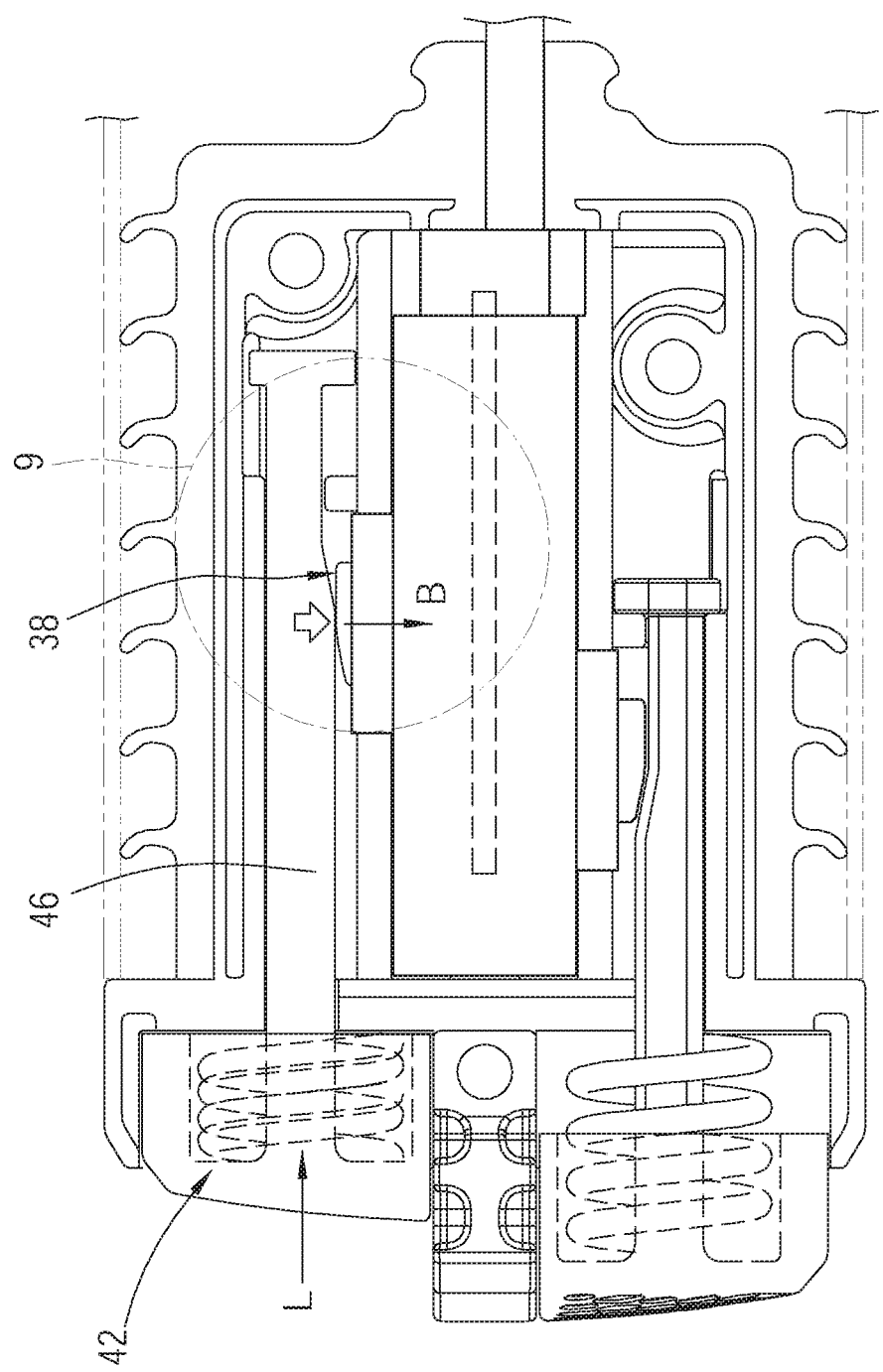
FIG. 8 is a partial side view, showing the switch of the control device according to the first embodiment of the present disclosure is pressed, wherein one of the half portions of the sleeve member and the second half body are omitted.
Figure 9:
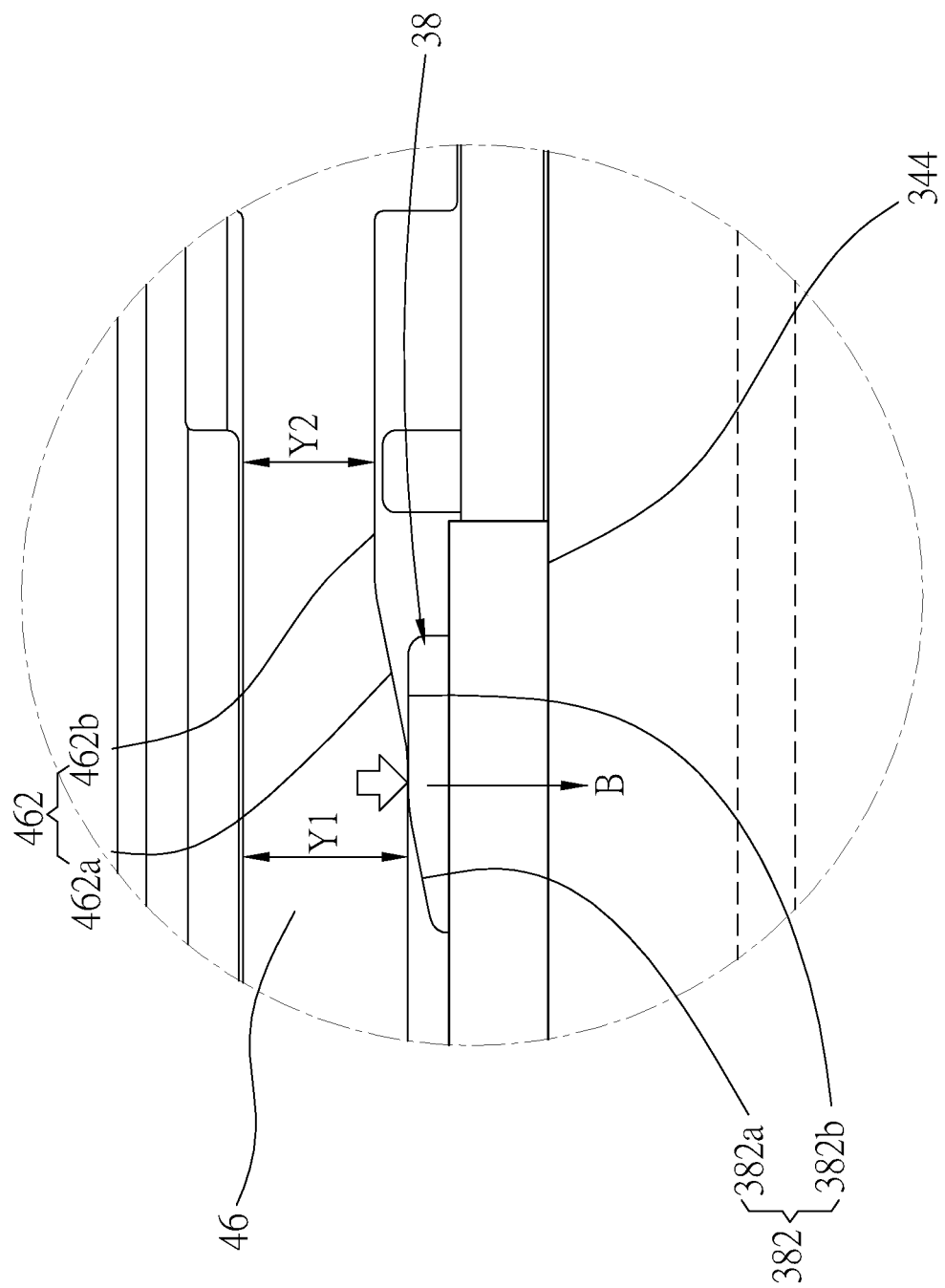
FIG. 9 is a partially enlarged view of FIG. 8.

More specifically, as shown in FIG. 7, the shaft portion 46 has a first maximum height Y1 at where the first activating surface 462a corresponds to, and has a second maximum height Y2 at where the second activating surface 462b corresponds to, wherein the first maximum height Y1 is greater than the second maximum height Y2. In a direction perpendicular to the surface 342 of the electronic module 32, a minimum height Y3 is between the third activating surface 382a of the switch 38 and the surface 342 of the electronic module 32; a third maximum height Y4 is between the fourth activating surface 382b of the switch 38 and the surface 342 of the electronic module 32, wherein the minimum height Y3 is smaller than the third maximum height Y4. One of the chambers (i.e., the chamber 224a) has a fourth maximum height Y5 between an inner peripheral surface of the inner case 22 of the plugged portion 12 and the surface 342 of the electronic module 32, wherein a sum of the first maximum height Y1 and the minimum height Y3 is slightly smaller than or equal to or slightly greater than the fourth maximum height Y5, and a sum of the first maximum height Y1 and the third maximum height Y4 is greater than the fourth maximum height Y5. In this way, when the input member 42 operates in the operating direction L (as shown in FIG. 8 and FIG. 9), the first activating surface 462a of the shaft portion 46 gradually moves along the third activating surface 382a of the switch 38, and finally exerts a force on the fourth activating surface 382b of the switch 38 to urge the switch 38 moves in the predetermined direction B, thereby the electronic module 32 forms a complete circuit and generates the electronic signal to control the corresponding bicycle electronic device. In other words, when the shaft portion 46 operates in the operating direction L, the first activating surface 462a obliquely pushes the third activating surface 382a of the switch 38, so that the switch 38 moves in the predetermined direction B, and then, the shaft portion 46 vertically pushes the fourth activating surface 382b of the switch 38 downward to press the switch 38.

In the current embodiment, the two switches 38 respectively located on two virtual lines P1, P2 which are perpendicular to the surfaces 342 of the electronic module 32 (i.e., one of the switches 38 is closer to the holding portion 14), so that a length of the shaft portion 46 of one of the input members 42 is shorter than the other one. In practice, the two switches 38 could be located on the same virtual line which is perpendicular to the surfaces 342 of the electronic module 32, and the shaft portion 46 of the two input members 42 have the same length.

Figure 10:
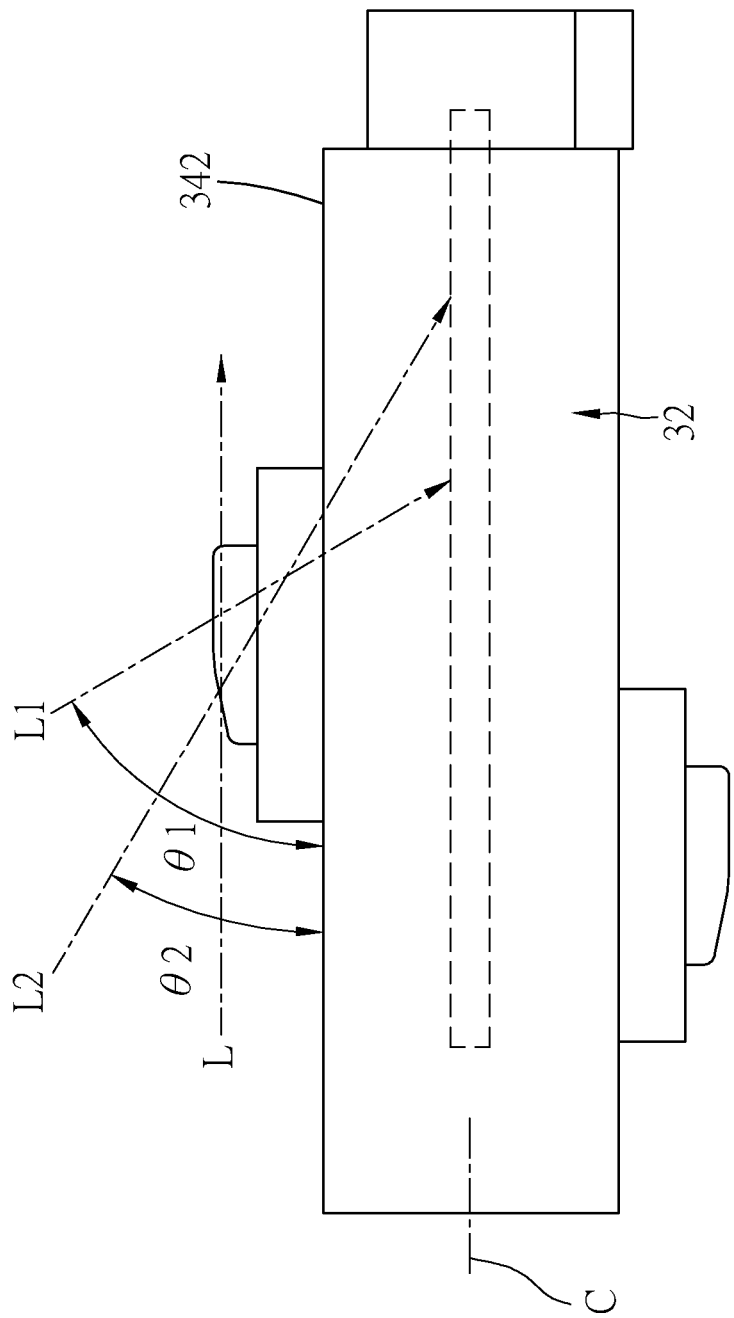
FIG. 10 is a schematic view, showing different operating directions of the input member.

As shown in FIG. 10, in the current embodiment, the operating direction L is parallel to the surfaces 342 of the electronic module 32 and is parallel to the longitudinal axis direction C of the plugged portion 12 (i.e., an angle between the operating direction L and the surfaces 342 of the electronic module 32 is 0 degree). In practice, the operating direction L of the input member 42 could be not parallel to the surfaces 342 of the electronic module 32 (i.e., an angle between the operating direction L and the surfaces 342 of the electronic module 32 is smaller than 90 degrees). For instance, an angle θ1 between an operating direction L1 and the surfaces 342 of the electronic module 32 is between 0-60 degrees. Preferably, an angle θ2 between an operating direction L2 and the surfaces 342 of the electronic module 32 is between 0-30 degrees. In other words, the operating direction L is not perpendicular to the longitudinal axis direction C of the plugged portion 12. In this way, the rider could easily press the input members 42 in an ergonomic manner.

Figure 11:
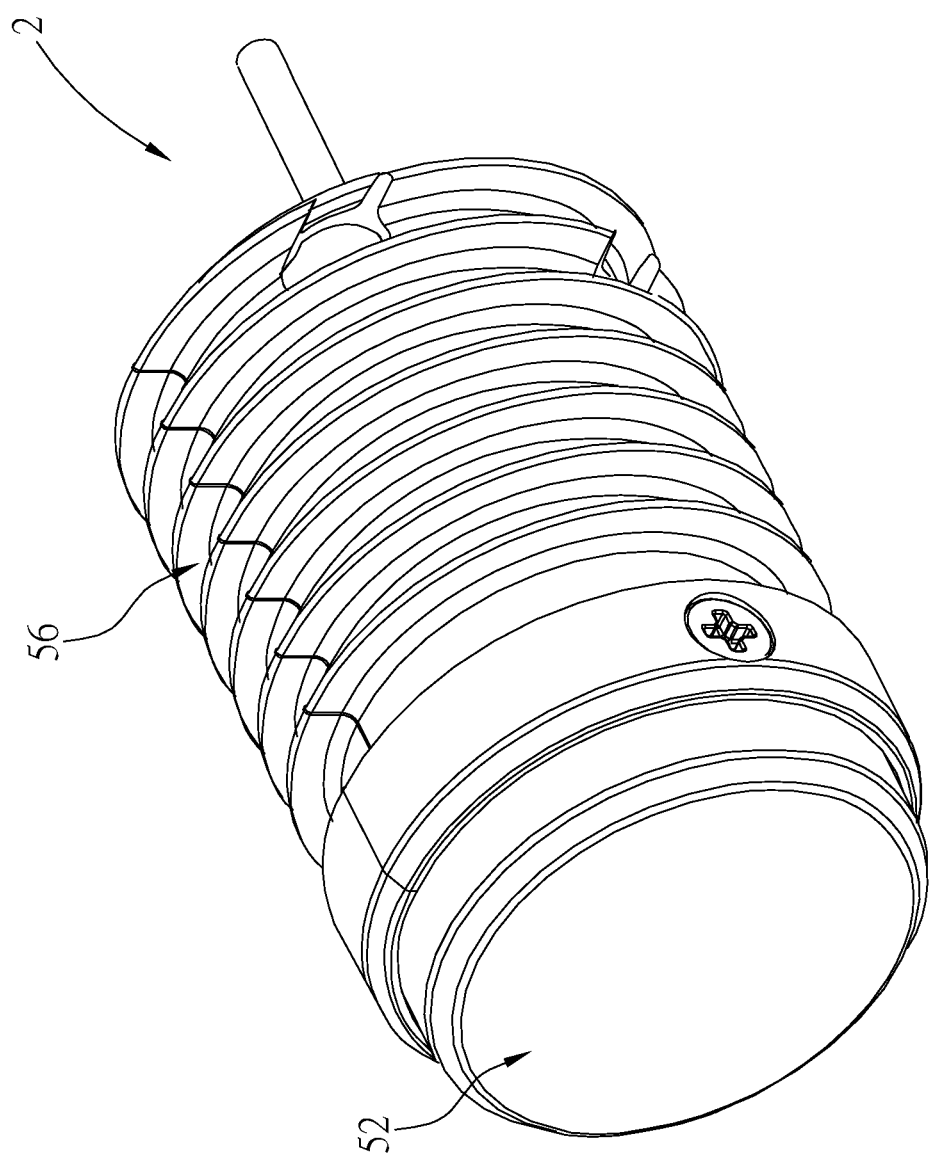
FIG. 11 is a perspective view of the control device according to a second embodiment of the present disclosure.
Figure 12:
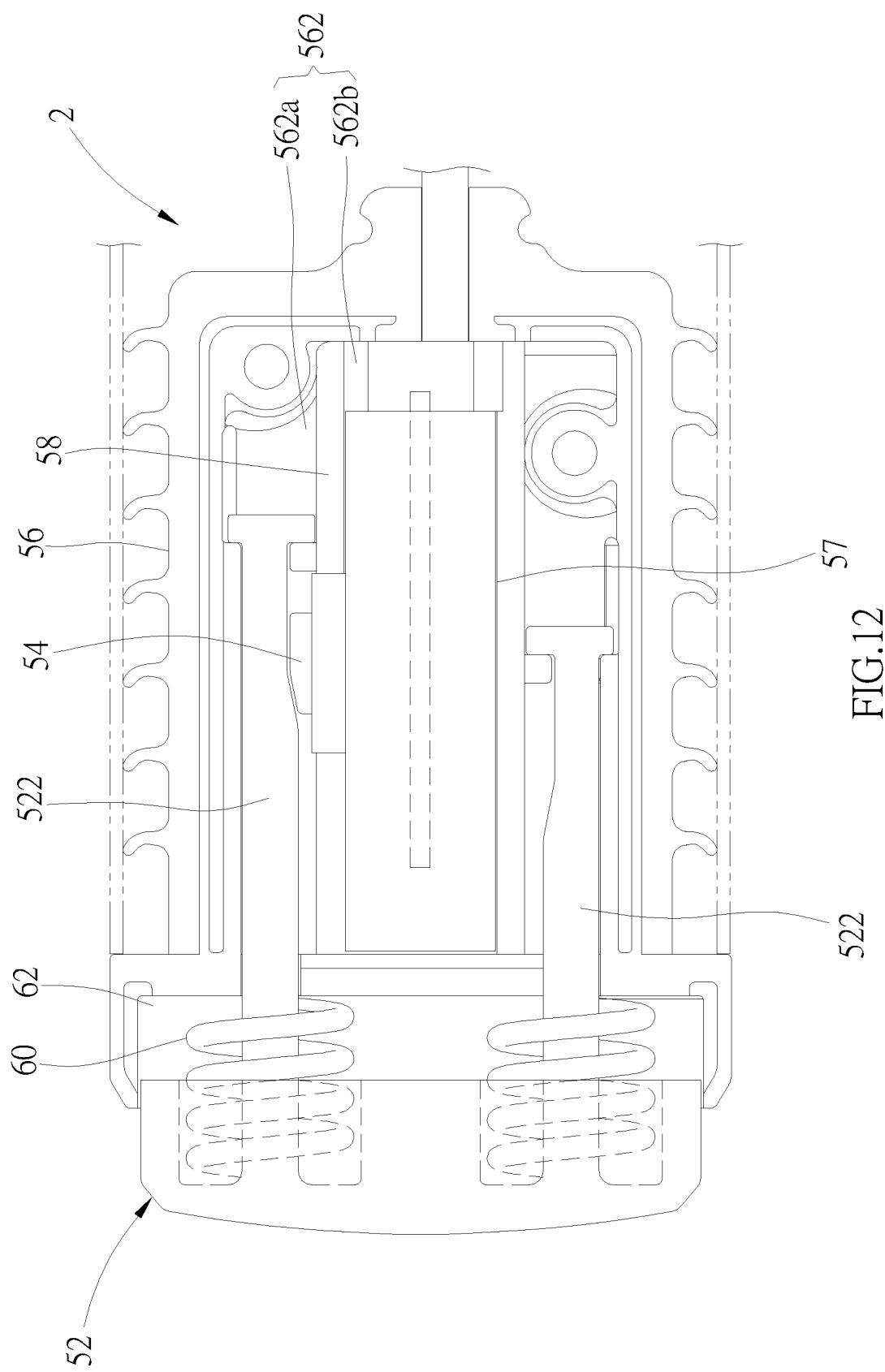
FIG. 12 is a partial side view of the control device according to the second embodiment of the present disclosure, wherein one of the half portions of the sleeve member and the second half body are omitted.

A control device 2 for a bicycle according to a second embodiment of the present disclosure is illustrated in FIG. 11 and FIG. 12, which has almost the same structure as that of the first embodiment, except that a number of an input member 52 is one, and a number of a switch 54 is one in the current embodiment. A number of a dividing member 58 in a receiving space 562 of a plugged portion 56 is one, wherein the dividing member 58 divides the receiving space 562 into two chambers 562a, 562b. An electronic module 57 is located in one of the chambers (i.e., the chamber 562b).

In addition, in the current embodiment, the input member 52 has two shaft portions 522. Two elastic members respectively fit around the shaft portions 522 to be located in a receiving recess 62. In this way, when one of the shaft portions 522 operates in the operating direction L and contacts the switch 54, the other shaft portion 522 could be used as an auxiliary balance, so that the input member 52 could move smoothly. In practice, the other shaft portion 522 and the elastic member 60 disposed thereon could be omitted, and the switch 54 could be pressed as well.

Figure 13:
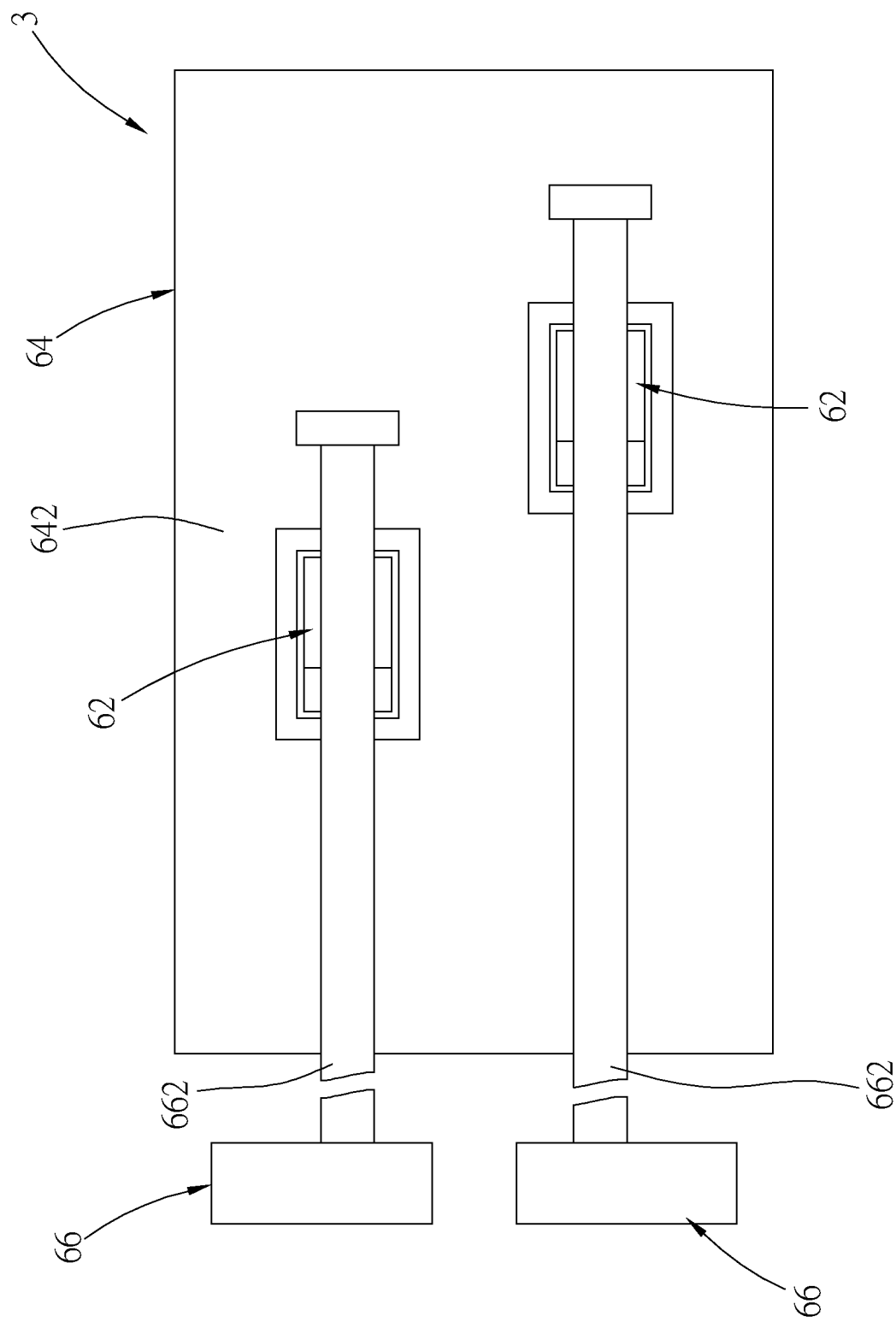
FIG. 13 is a partial top view of the control device according to a third embodiment of the present disclosure.

A control device 3 for a bicycle according to a third embodiment of the present disclosure is illustrated in FIG. 13, which has almost the same structure as that of the first embodiment, except that in the current embodiment, two switches 62 are located on the same side of an electronic module 64, and protrude from the same surface 642 of the electronic module 64, wherein a shaft portion 662 of each of two input members 66 is adapted to activate one of the switches 62.

Figure 14:
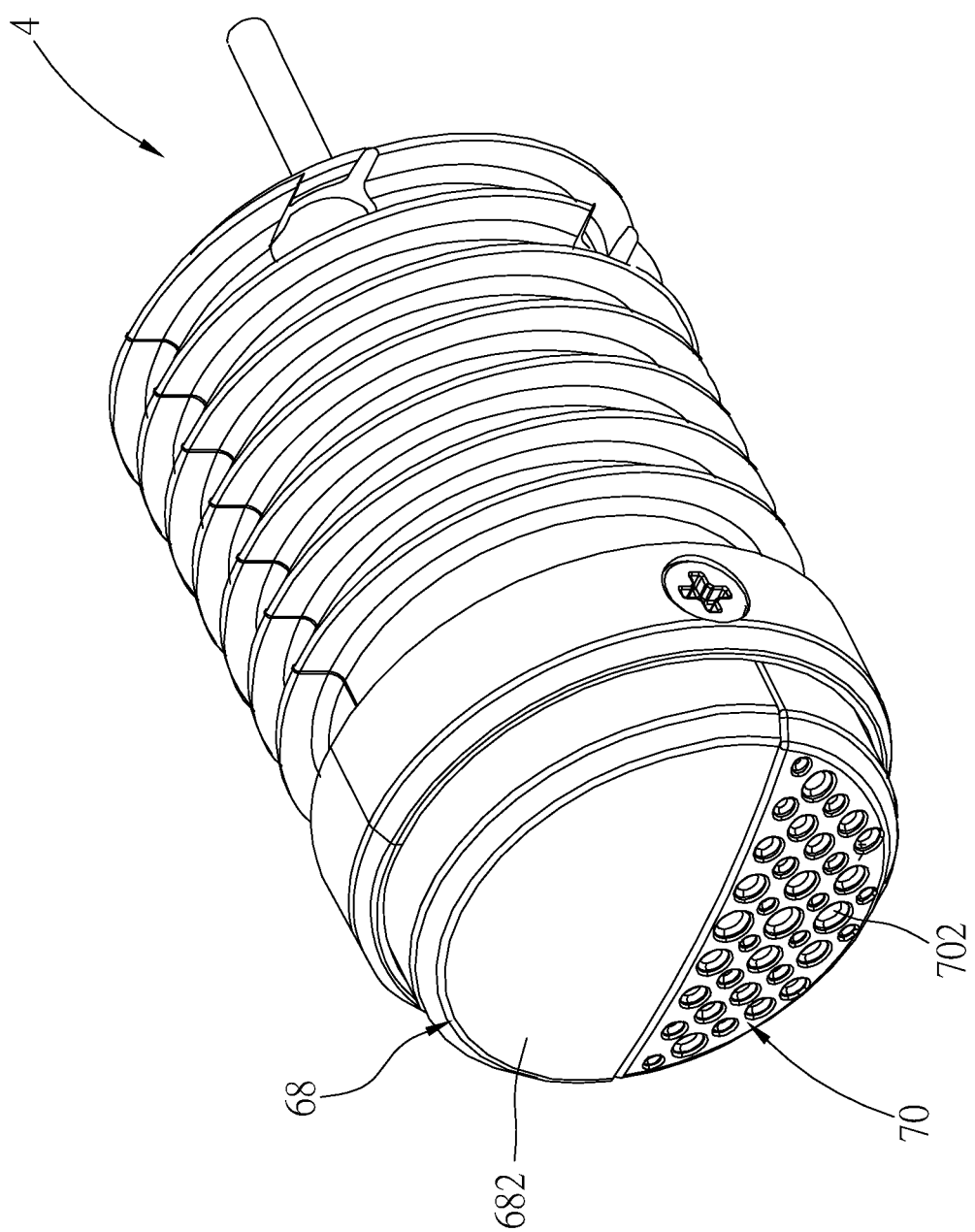
FIG. 14 is a perspective view of the control device according to a fourth embodiment of the present disclosure.
Figure 15:
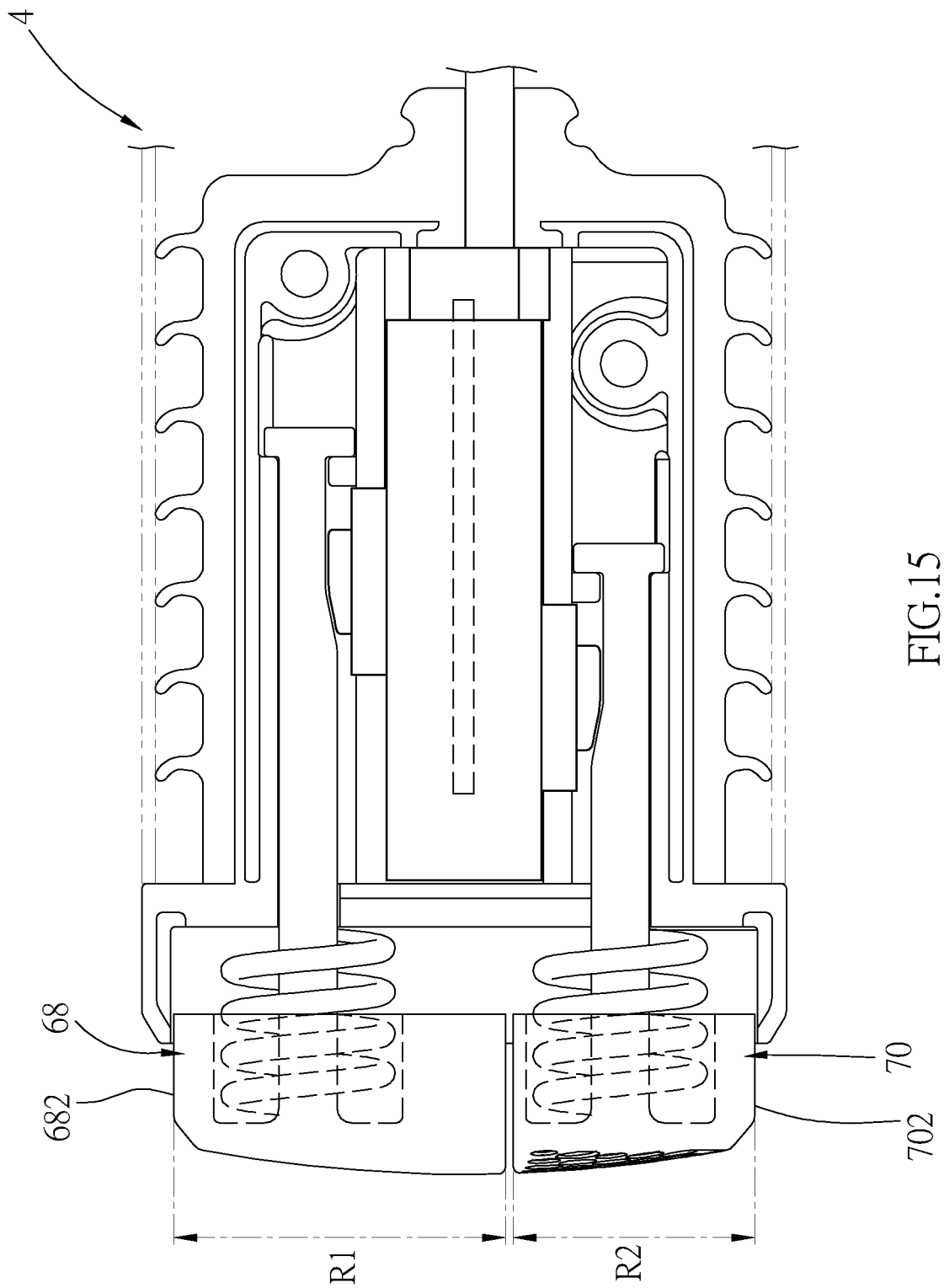
FIG. 15 is a partial side view of the control device according to the fourth embodiment of the present disclosure, wherein one of the half portions of the sleeve member and the second half body are omitted.

A control device 4 for a bicycle according to a fourth embodiment of the present disclosure is illustrated in FIG. 14 and FIG. 15, which has almost the same structure as that of the first embodiment, except that in the current embodiment, two input members are a first input member 68 and a second input member 70, wherein an operating portion 682 of the first input member 68 has a first radial length R1, and an operating portion 702 of the second input member 70 has a second radial length R2. The first radial length R1 is greater than the second radial length R2. In other words, an area of an outer surface in an axial direction of the operating portion 682 of the first input member 68 is greater than an outer surface in an axial direction of the operating portion 702 of the second input member 70. In this way, the rider's two different fingers could respectively press the operating portions 682, 702 with different areas. For instance, the rider could press the operating part 682 of the first input member 68 via the thumb, and could press the operating part 702 of the second input member 70 via the forefinger.

Figure 16:
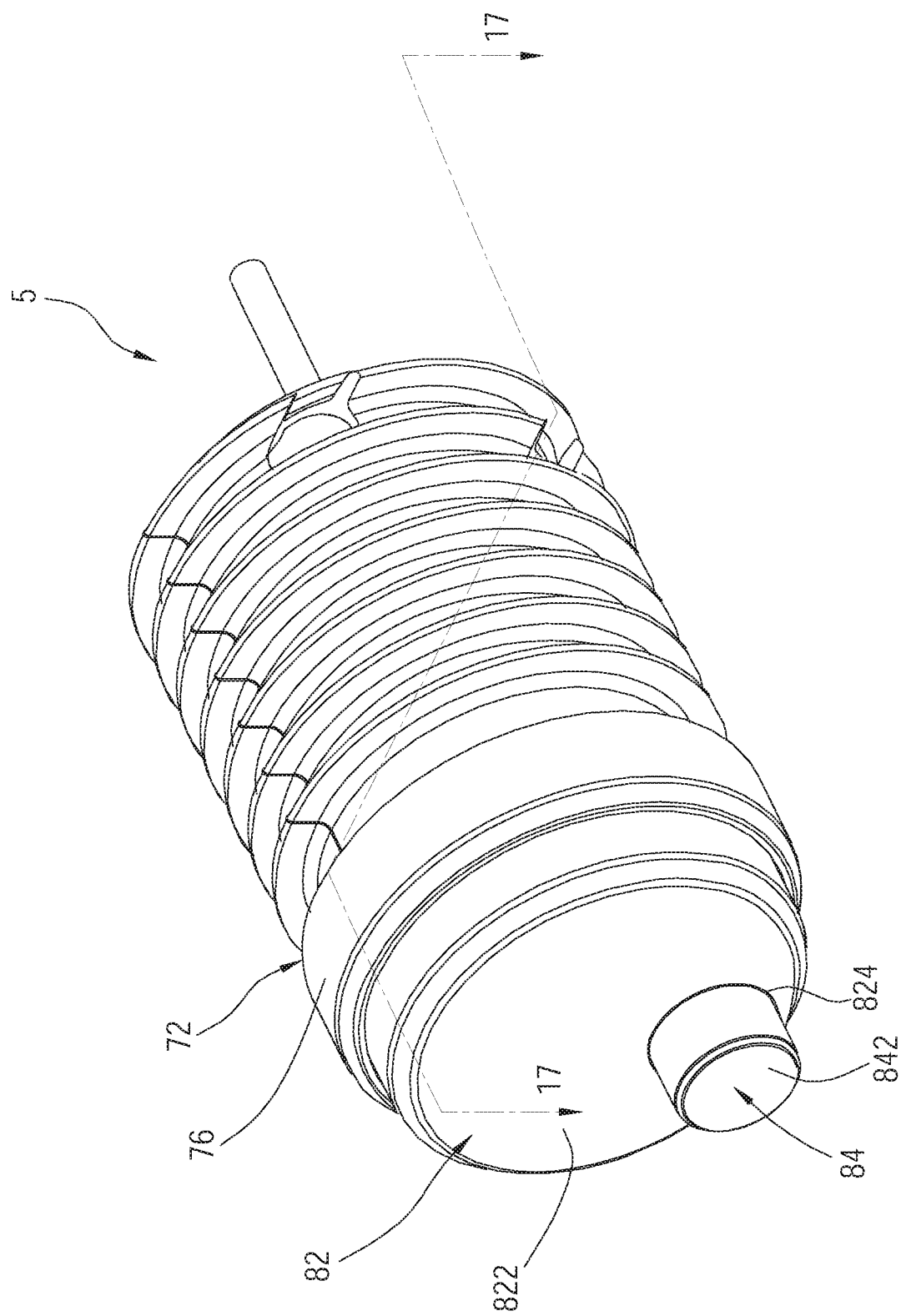
FIG. 16 is a perspective view of the control device according to a fifth embodiment of the present disclosure.
Figure 17:
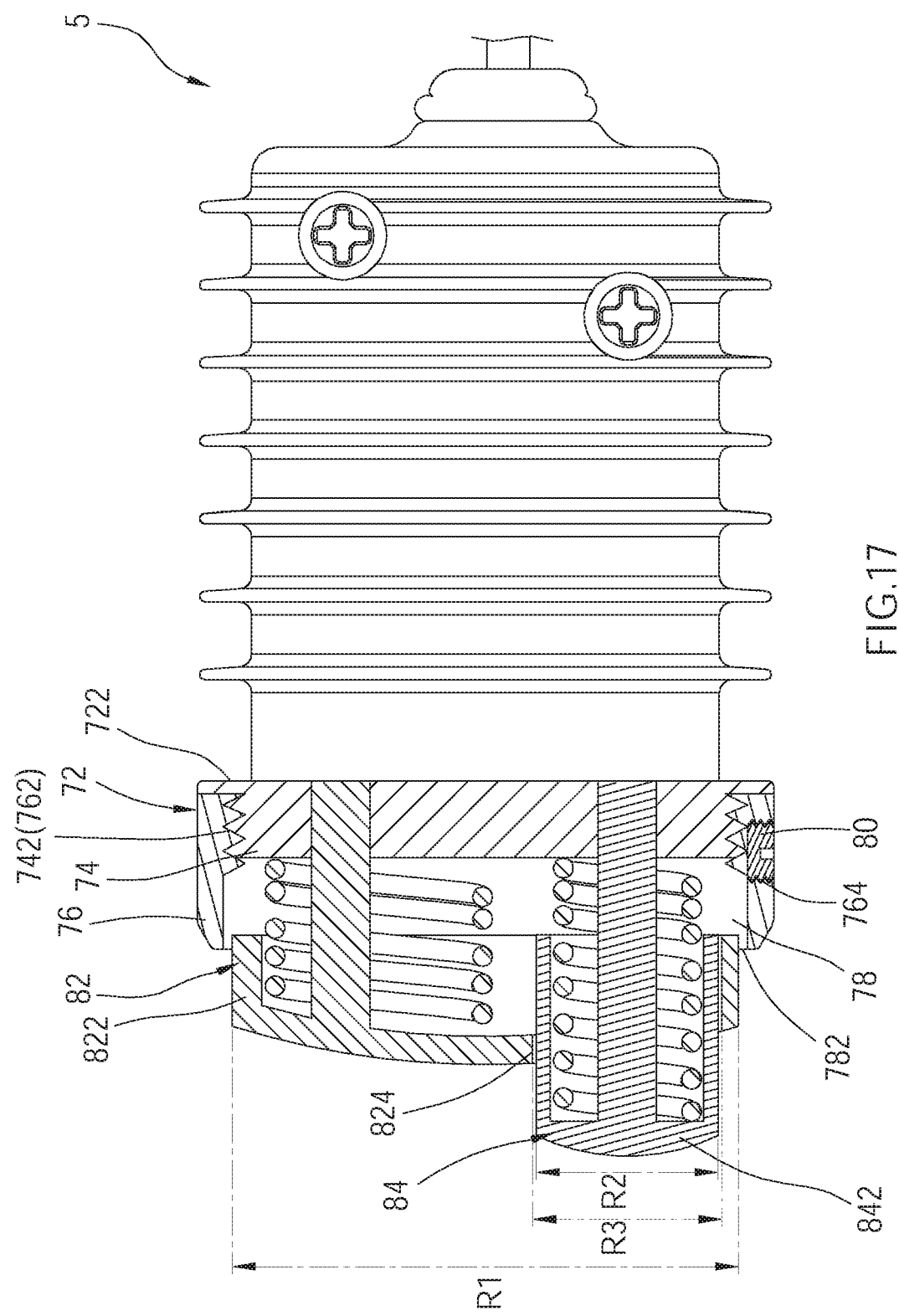
FIG. 17 is a sectional simplified view of the control device according to the fifth embodiment of the present disclosure.

A control device 5 for a bicycle according to a fifth embodiment of the present disclosure is illustrated in FIG. 16 and FIG. 17, which has almost the same structure as that of the first embodiment, except that in the current embodiment, a projecting portion 74 which axially extends toward a direction away from the abutting surface 722 is disposed on the holding portion 72 of the control device 5, wherein a first thread 742 is disposed on a radially outer peripheral surface of the projecting portion 74. The holding portion 72 further includes an extension ring 76, wherein a second thread 762 is disposed on a radially inner peripheral surface of the extension ring 76. The first thread 742 of the projecting portion 74 is screwed with the second thread 762 of the extension ring 76, thereby to form a receiving recess 78 having an opening 782. When the rider rotates the extension ring 76, a depth of the receiving recess 78 could be changed, thereby to adjust a length of each of the input members that protrudes out of the receiving recess 78. In practice, the projecting portion 74 and the extension ring 76 of the holding portion 72 in the current embodiment could be applied to the aforementioned embodiments. In the current embodiment, the extension ring 76 further has a threaded hole 764 located on a radial direction of the extension ring 76. By screwing a socket set screw 80 into the threaded hole 764 to abut against the first thread 742, the extension ring 76 could be fixed.

In addition, in the current embodiment, two input members are a first input member 82 and a second input member 84, wherein an operating portion 822 of the first input member 82 has a first radial length R1, and an operating portion 842 of the second input member 84 has a second radial length R2. The first radial length R1 is greater than the second radial length R2. A through hole 824 is disposed on the operating portion 822 of the first input member 82, and has a third radial length R3 which is slightly greater than the second radial length R2, so that the second input member 84 movably passes through the through hole 824 of the operating portion 822 of the first input member 82.

Figure 18:
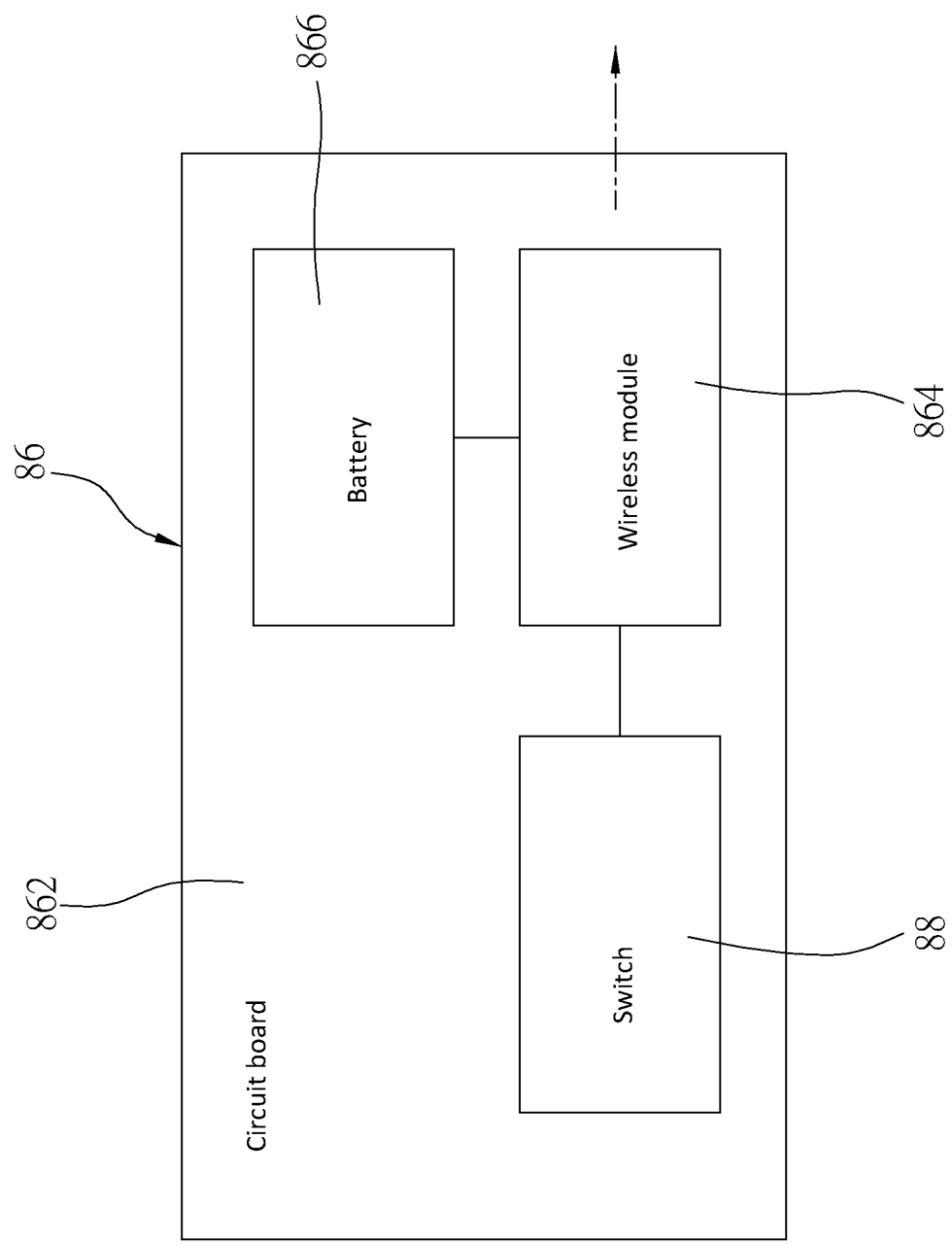
FIG. 18 is a schematic view, showing the electronic module of the control device according to a sixth embodiment of the present disclosure.

An electronic module 86 of a control device for a bicycle according to a sixth embodiment of the present disclosure is illustrated in FIG. 18, and includes a circuit board 862, a wireless module 864, and a battery 866, wherein the wireless module 86 and the battery 866 are electrically connected to the circuit board 862. At least one switch 88 is electrically connected to the wireless module 864. When the switch 88 is activated, an electronic signal generated by the wireless module 864 is wirelessly sent to the corresponding bicycle electronic device. In practice, the electronic module 86 in the current embodiment could be applied to the aforementioned embodiments.

With the aforementioned design, when the control device is disposed on the handlebar, the control device has less exposed volume, thereby wind resistance is reduced. In addition, the input member is located outside the opening of the handlebar, so that when the rider holds the handlebar, the input member could be pressed by the rider's finger in a direction toward the opening, which is easier to control and saves effort in an ergonomic manner. It is worth mentioning that, when the electronic module is parallel to the central axis of the handlebar, or when the angle between the electronic module and the central axis of the handlebar is smaller than 30 degrees, the length of the electronic module could be longer, so that more electronic components could be disposed on the electronic module without being limited by a diameter of the handlebar.

In the aforementioned embodiments, the number of the input member and the number of the switch are one or two for illustration. However, this is not a limitation of the present invention. In practice, the number of the switch could be more than three, and the number of the input member could be more than three, and each surface of the electronic module could be disposed with at least one switch.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A control device for a bicycle, which is disposed on a handlebar having an opening comprising:
    a body comprising a plugged portion and a holding portion, wherein the plugged portion is disposed inside the handlebar via the opening; the holding portion is connected to the plugged portion and is disposed outside the opening;
    an electronic module which is disposed in the plugged portion and has at least one surface;
    at least one switch disposed on the at least one surface of the electronic module, thereby to selectively control the electronic module to send an electronic signal; and
    at least one input member which is disposed on the holding portion and extends into the plugged portion, wherein the at least one input member moves in an operating direction, thereby to actuate the at least one switch; the operating direction is not perpendicular to the at least one surface of the electronic module;
    wherein an operating portion and a shaft portion are disposed on the at least one input member; the operating portion is movably disposed on the holding portion; the shaft portion extends from the operating portion toward the plugged portion, and a part of the shaft portion is disposed in the plugged portion; the shaft portion has a first surface; the at least one switch has a second surface; the shaft portion pushes the second surface via the first surface, so that the electronic module sends the electronic signal;
    wherein the first surface has a first activating surface and a second activating surface; the second surface has a third activating surface and a fourth activating surface; during an activating state, the first activating surface pushes the third activating surface, so that the at least one switch moves in a predetermined direction which intersects the operating direction.

2. The control device of claim 1, wherein an angle between the operating direction and the at least one surface of the electronic module is between 0-60 degrees.

3. The control device of claim 1, wherein an angle between the operating direction and the at least one surface of the electronic module is between 0-30 degrees.

4. The control device of claim 1, wherein the operating direction is parallel to the at least one surface of the electronic module.

5. The control device of claim 1, wherein the at least one surface of the electronic module is parallel to a central axis of the handlebar.

6. The control device of claim 1, wherein the first activating surface is not parallel to the second activating surface; the third activating surface is not parallel to the fourth activating surface.

7. The control device of claim 1, wherein the holding portion comprises an abutting surface and a blocking surface which face opposite directions; the abutting surface abuts against an outer peripheral edge in the axial direction of the opening; the control device comprises an elastic member disposed on the shaft portion; the elastic member provides a reverse force opposite to the operating direction to the shaft portion; an end of the elastic member abuts against the blocking surface, and another end of the elastic member abuts against the at least one input member.

8. The control device of claim 7, wherein the holding portion comprises a receiving recess having an inner wall; the inner wall is formed by axially extending from an outer peripheral edge of the blocking surface to a direction away from the opening; a part of the elastic member is disposed in the receiving recess.

9. The control device of claim 7, wherein the holding portion comprises a projecting portion and an extension ring; the projecting portion axially extends toward a direction away from the abutting surface; a first thread is disposed on a radially outer peripheral surface of the projecting portion; a second thread is disposed on an inner peripheral surface of the extension ring; the first thread of the projecting portion is screwed with the second thread of the extension ring, thereby to form a receiving recess; a part of the elastic member is disposed in the receiving recess.

10. The control device of claim 1, wherein the at least one input member of the control device comprises two input members; the at least one switch comprises two switches protruding from the at least one surface of the electronic module.

11. The control device of claim 10, wherein the at least one surface of the electronic module comprises two surfaces; the two switches respectively protrude from the two surfaces of the electronic module; the two surfaces are not coplanar.

12. The control device of claim 10, wherein the two input members are a first input member and a second input member; a through hole is disposed on the first input member; a part of the second input member movably passes through the through hole of the first input member.

13. The control device of claim 1, wherein the plugged portion comprises an inner case and a sleeve member; the sleeve member fits around the inner case; an outer peripheral surface of the sleeve member abuts against an inner peripheral surface of the handlebar.

14. A control device for a bicycle, which is disposed on a handlebar having an opening, comprising:
- a body comprising a plugged portion and a holding portion, wherein the plugged portion is disposed inside the handlebar via the opening; the holding portion is connected to the plugged portion and is disposed outside the opening;
- an electronic module which is disposed in the plugged portion and has at least one surface;
- at least one switch disposed on the at least one surface of the electronic module, thereby to selectively control the electronic module to send an electronic signal; and
- at least one input member which is disposed on the holding portion and extends into the plugged portion, wherein the at least one input member moves in an operating direction, thereby to actuate the at least one switch; the operating direction is not perpendicular to the at least one surface of the electronic module;
- wherein an operating portion and a shaft portion are disposed on the at least one input member; the operating portion is movably disposed on the holding portion; the shaft portion extends from the operating portion toward the plugged portion, and a part of the shaft portion is disposed in the plugged portion; the shaft portion has a first surface; the at least one switch has a second surface; the shaft portion pushes the second surface via the first surface, so that the electronic module sends the electronic signal;
- wherein at least one dividing member is disposed in the plugged portion; a through hole and a blocking member are disposed on the at least one dividing member; the at least one switch protrudes through the through hole from the at least one surface of the electronic module; a blocking portion is disposed on the at least one input member and is located on an end of the shaft portion opposite to the operating portion; the blocking member is selectively abutted against the blocking portion.

15. A control device for a bicycle, which is disposed on a handlebar having an opening, comprising:
- a body comprising a plugged portion and a holding portion, wherein the plugged portion is disposed inside the handlebar via the opening; the holding portion is connected to the plugged portion and is disposed outside the opening;
- an electronic module which is disposed in the plugged portion and has at least one surface;
- at least one switch disposed on the at least one surface of the electronic module, thereby to selectively control the electronic module to send an electronic signal; and
- at least one input member which is disposed on the holding portion and extends into the plugged portion, wherein the at least one input member moves in an operating direction, thereby to actuate the at least one switch; the operating direction is not perpendicular to the at least one surface of the electronic module;
- wherein an operating portion and a shaft portion are disposed on the at least one input member; the operating portion is movably disposed on the holding portion; the shaft portion extends from the operating portion toward the plugged portion, and a part of the shaft portion is disposed in the plugged portion; the shaft portion has a first surface; the at least one switch has a second surface; the shaft portion pushes the second surface via the first surface, so that the electronic module sends the electronic signal; wherein the shaft portion directly contacts the at least one switch to transmit a force;
- wherein the force that the shaft portion exerts on the at least one switch is not parallel to the operating direction of the shaft portion and is not parallel to a predetermined direction that the at least one switch moves.

* * * * *